(12) United States Patent
Dames et al.

(10) Patent No.: US 8,912,683 B2
(45) Date of Patent: Dec. 16, 2014

(54) SMART RESPONSIVE ELECTRICAL LOAD

(75) Inventors: Andrew Dames, Cambridge (GB);
Kimon Roussopoulos, Cambridge (GB);
Tim Norris, Sandviken (NO); Andrew Howe, Kent (GB)

(73) Assignee: Open Energi Limited, London (GB)

( * ) Notice: Subject to any disclaimer, the term of this patent is extended or adjusted under 35 U.S.C. 154(b) by 449 days.

(21) Appl. No.: 12/998,164

(22) PCT Filed: Sep. 18, 2009

(86) PCT No.: PCT/NO2009/000326
§ 371 (c)(1),
(2), (4) Date: Apr. 21, 2011

(87) PCT Pub. No.: WO2010/033038
PCT Pub. Date: Mar. 25, 2010

(65) Prior Publication Data
US 2011/0198922 A1    Aug. 18, 2011

(30) Foreign Application Priority Data

Sep. 22, 2008 (GB) ................... 0817293.4
Jan. 26, 2009 (GB) ................... 0901212.1
Apr. 8, 2009 (GB) ................... 09065004
Jul. 8, 2009 (GB) ................... 0911923.1

(51) Int. Cl.
*H02J 3/14* (2006.01)
*H02J 7/02* (2006.01)

(52) U.S. Cl.
CPC .... *H02J 3/14* (2013.01); *Y04S 20/222* (2013.01); *Y04S 30/12* (2013.01); *Y02T 90/168* (2013.01); *H02J 7/02* (2013.01); *Y02B 70/3225* (2013.01)
USPC .................. 307/38; 307/35; 307/11; 307/131; 713/320; 318/560; 318/282; 700/295; 700/286; 700/96; 219/490; 219/492; 219/494; 315/291; 315/292; 315/294

(58) Field of Classification Search
USPC ......... 307/38, 34, 11, 131; 361/631; 318/560, 318/3, 282; 392/464, 693.3; 700/295, 96, 700/286; 315/149, 158, 291, 294; 219/490, 219/492, 510, 496; 102/217, 215, 23; 713/320
See application file for complete search history.

(56) References Cited

U.S. PATENT DOCUMENTS

| | | |
|---|---|---|
| 4,317,049 A | 2/1982 | Schweppe |
| 4,385,241 A | 5/1983 | Peddie et al. |
| 4,987,513 A | 1/1991 | Shelley |

(Continued)

FOREIGN PATENT DOCUMENTS

| | | | |
|---|---|---|---|
| EP | 1467463 A1 | 10/2004 | |
| EP | WO2006/128709 A2 | 12/2006 | |

(Continued)

OTHER PUBLICATIONS

PNNL 17079 Gridwise project: http://gridwise.pnl.giv/docs/gfa_project_final_report_pnnl14049.pdf.

(Continued)

*Primary Examiner* — Rexford Barnie
*Assistant Examiner* — Jagdeep Dhillon
(74) *Attorney, Agent, or Firm* — Abelman, Frayne & Schwab

(57) ABSTRACT

A smart responsive electrical load (10) is operatively connectable to an electricity supply network (20). The smart responsive electrical load (10) comprises an electrical power-consuming device (30) and a control arrangement (40) for controlling a supply of electrical power from the network (20) to the device (30). The control arrangement (60, 110, 150, 160, 170) is operable to impose a variable time delay ($t_p$) before supplying electrical power to the device (30) after a request for power to be provided to the device (30). The variable time delay ($t_p$) is a function of a state of the network (20), for example its frequency (f) and/or its voltage amplitude (V). Optionally, the device (30) is a battery charger, for example for use with a rechargeable electric vehicle. Beneficially, the smart responsive load (10) is supplied with electrical power from a population of micro-generation devices (500) operable to provide supply network response.

24 Claims, 10 Drawing Sheets

(56) References Cited

U.S. PATENT DOCUMENTS

| | | | |
|---|---|---|---|
| 5,442,335 A | 8/1995 | Cantin et al. | |
| 5,481,169 A * | 1/1996 | Turetta et al. | 318/560 |
| 6,314,378 B1 | 11/2001 | Hodge et al. | |
| 6,603,218 B1 | 8/2003 | Aisa | |
| 7,242,114 B1 | 7/2007 | Cannon et al. | |
| 7,385,374 B2 * | 6/2008 | Frantz et al. | 320/138 |
| 7,420,293 B2 * | 9/2008 | Donnelly et al. | 307/34 |
| 8,295,960 B2 * | 10/2012 | Cooper et al. | 700/96 |
| 2003/0225483 A1 * | 12/2003 | Santinato et al. | 700/295 |
| 2004/0051387 A1 | 3/2004 | Lasseter et al. | |
| 2005/0180075 A1 | 8/2005 | Simpson | |
| 2006/0072262 A1 | 4/2006 | Paik et al. | |
| 2006/0255791 A1 | 11/2006 | Messing et al. | |
| 2007/0047163 A1 | 3/2007 | Lutze et al. | |
| 2007/0120369 A1 | 5/2007 | Delmerico et al. | |
| 2007/0129851 A1 | 6/2007 | Rossi et al. | |
| 2007/0198133 A1 | 8/2007 | Hirst | |
| 2009/0217065 A1 * | 8/2009 | Araujo, Jr. | 713/320 |
| 2009/0323257 A1 * | 12/2009 | Sarid et al. | 361/631 |

FOREIGN PATENT DOCUMENTS

| | | |
|---|---|---|
| EP | 1739806 A1 | 1/2007 |
| GB | 2361118 A | 10/2001 |
| GB | 2436253 A | 9/2007 |
| GB | 2449600 A | 9/2007 |
| GR | 1003985 B1 | 9/2002 |
| WO | WO 2005/029670 A1 | 3/2005 |
| WO | WO 2005/076431 A1 | 8/2005 |
| WO | WO 2008/039759 A2 | 4/2008 |

OTHER PUBLICATIONS

Short, J., et al., IEEE: http://ieeexplore.ieee.org/stamp/stamp.isp?arnumber=4282051&isnumber=4282002.

International Search Report and Written Opinion mailed on Oct. 12, 2009 by the Noridc Patent Institute in counterpart application No. PCT/NO2009/000236; and.

International Preliminary Report on Patentability, completed Nov. 26, 2009, by the Nordic Patent Institute in counterpart application No. PCT/NO2009/000326.

Technical Paper: F. Schroder and J. Sandell, "Control Strategy Using Under Frequency Load Shed Relays", Capricornia Institute of Advanced Education, 1981, pp. 1-3.

Cover letter from Jack Sandell dated Mar. 28, 2011 regarding Technical Paper by F. Schroder and J. Sandell.

* cited by examiner

SMART RESPONSIVE ELECTRICAL LOAD

CROSS REFERENCE TO RELATED APPLICATION

This application claims benefit under 35 U.S.C. §371 to international application No. PCT/NO2009/000326, filed on Sep. 18, 2009.

FIELD OF THE INVENTION

The present invention relates to smart responsive electrical loads. Moreover, the invention also concerns methods of providing electrical supply network load control using these smart responsive electrical loads. Furthermore, the present invention relates to electrical supply networks including one or more of these smart responsive electrical loads. Additionally, the present invention relates to software products executable on computing hardware for implementing such methods.

BACKGROUND OF THE INVENTION

Devices and methods for providing a smart load for an electricity supply network are described in an earlier published international PCT patent application WO 06/28709A2 which is hereby incorporated by reference. This published patent application describes refrigerators and draws an analogy with pumping water into a tank. However, the application does not consider other types of devices having other operating constraints. Thus, electrical load shedding in response to changes in electrical supply network mains line frequency is known and is based on devices such as water heaters and refrigerators. Moreover, automatic start-up after an electrical black out is also known.

At present, the World consumes circa 80 million barrels of oil per day. A significant portion of this oil is employed for transport, for example for automobiles, trucks, ships and aircraft. Petroleum represents an extremely concentrated form of energy which is convenient to employ in mobile apparatus, for example automobiles. However, there is a desire to employ electrical power for road transport in the future, wherein the electrical power is ideally generated from renewable energy sources. In practice, the electrical power is more likely to be derived from burning coal in coal-fired power stations (creating greenhouse gases) and from nuclear reactors (generating dangerous long-lived radioactive waste). Such coal-fired power stations and nuclear power stations are known to be capable of coping with a steady baseline load but have difficulty coping with rapidly fluctuating demand. Moreover, when a large portion of society employs personal electric transport, it is expected that electricity supply demands will be much greater in future with greater temporal fluctuations in such electrical demand.

For example, rapid battery chargers for electric vehicles are each expected to consume several kiloWatts (kW) of electrical power from electrical supply networks when charging batteries of these vehicles. Such a magnitude of consumption dwarfs an amount of power consumed by refrigerators and similar appliances. However, methods of controlling heating and cooling in refrigerators are quite inappropriate when charging batteries, for example charging lithium batteries or ultra capacitors, which have very different requirements. For example, a company EEstor Inc. is alleged to have recently developed an ultracapacitor based upon barium titanate material in nano-particle form offering an energy storage density in excess of 300 Wh/kg with unlimited number of recharge/discharge cycles; if such battery technology can be implemented in an economical form, it represents a major breakthrough in electric road transport paving a way for a transition from combustion engine road transport to electric road transport.

Some processes, for example battery charging processes, are both energy intensive and complex, namely requiring carefully controlled sequences of charging power variations to complete for maintaining optimal battery lifetime. Such charging processes do not fall within constraints appropriate for controlling refrigerators pursuant to the international PCT patent application WO 06/28709A2. In respect of battery charging, electrical supply line-frequency responsive processes that disconnect electrical devices at times of grid stress are undesirable. Similarly, washing machines and dishwashers respond badly to being disconnected for periods from their electrical supply network; for example, dish washers are required to achieve a sufficiently high temperature to ensure that microbes are destroyed during dish washing, and clothes can be damaged if left for unnecessarily prolonged periods at elevated temperatures.

There thus arises a need for alternative types of smart responsive electrical loads for use in stabilizing electrical supply networks which are able to cope with complex energy consuming processes which employ complex sequences of steps in contradistinction to simple on-off devices, for example refrigerators.

SUMMARY OF THE INVENTION

The present invention seeks to provide an improved smart responsive electrical load for use with an electrical supply network, the smart load being operable to provide responsive load control for the network whilst also accommodating needs of complex energy consuming processes associated with the smart responsive electrical load.

According to a first aspect of the present invention, there is provided a smart responsive electrical load as claimed in appended claim 1: there is provided a smart responsive electrical load operatively connectable to an electricity supply network, the smart responsive electrical load comprising an electrical power-consuming device and a control arrangement for controlling a supply of electrical power from the network to the device, characterized in that the control arrangement is operable to impose a variable time delay ($t_p$) before supplying electrical power to the device after a request for power to be provided to the device, the variable time delay ($t_p$) being a function of a state of the network.

The invention is of advantage in that use of the variable time delay as a function of the state of the network for delaying consumption of electrical power by the device for providing network regulation is capable of coping with needs of complex energy consuming processes.

Optionally, in respect of the smart responsive load, the state of the network is a supply frequency (f) of the network.

Optionally, in respect of the smart responsive load, the state of the network is a supply magnitude (V) of the network.

Optionally, in respect of the smart responsive electrical load, the control arrangement is operable to supply electrical power in an uninterrupted manner to the device after the variable time delay ($t_p$) has elapsed.

More optionally, in respect of the smart responsive electrical load, the uninterrupted manner is not susceptible to being overridden by user intervention.

Optionally, in respect of the smart responsive electrical load, the control arrangement is operable to apply electrical power to the device in response to the supply frequency (f)

exceeding a threshold frequency value, the power being then applied to the device in an uninterrupted manner.

Optionally, in respect of the smart responsive electrical load, the control arrangement is operable to apply electrical power to the device in response to the supply magnitude (V) exceeding a threshold magnitude value, the power being then applied to the device in an uninterrupted manner.

More optionally, in respect of the smart responsive electrical load, the control arrangement is configured to receive in operation a digital clock signal for reference, the control arrangement being operable to compute the supply frequency (f) as a number of clock signal counts, and the control arrangement being operable to compute the variable time delay ($t_p$) as a function of multiples of the clock signal counts.

More optionally, in respect of the smart responsive electrical load, the control arrangement is operable to provide solely low-side response for the supply frequency (f) being lower than a nominal preferred value thereof.

More optionally, in respect of the smart responsive electrical load, the control arrangement is operable to provide solely high-side response for the supply frequency (f) being greater than a nominal preferred value thereof.

More optionally, in respect of the smart responsive electrical load, the control arrangement is operable to provide solely low-side response for the supply magnitude (V) being lower than a nominal preferred value thereof.

More optionally, in respect of the smart responsive electrical load, the control arrangement is operable to provide solely high-side response for the supply magnitude (V) being greater than a nominal preferred value thereof.

More optionally, in respect of the smart responsive electrical load, the control arrangement is operable to provide a combination of high-side response for the supply frequency (f) being greater than a nominal preferred value thereof, and low-side response for the supply frequency (f) being lower than the nominal preferred value.

More optionally, in respect of the smart responsive electrical load, the control arrangement is operable to provide a combination of high-side response for the supply magnitude (V) being greater than a nominal preferred value thereof, and low-side response for the supply magnitude (V) being lower than the nominal preferred value.

More optionally, in respect of the smart responsive electrical load, the threshold frequency value corresponds to at: (a) a nominal maximum value for the supply frequency (f); or (b) a nominal value for the supply frequency (f); or (c) a nominal minimum frequency value for the supply frequency (f).

More optionally, in respect of the smart responsive electrical load, the threshold frequency value is adjustable remotely from the control arrangement. For example, such remote control is implemented via the Internet, via wireless or similar communication media. More optionally, such remote control is determined by an operator of the network.

More optionally, in respect of the smart responsive electrical load, the threshold frequency value is randomly adjustable for enabling a plurality of the smart loads coupled to the network to provide a collectively smoothly changing load characteristic to the network.

Optionally, in respect of the smart responsive electrical load, the state of the network is subject to pre-filtering for defining a threshold value for controlling the variable time delay ($t_p$).

Optionally, in respect of the smart responsive electrical load, the threshold value is varied in response to time-of-day and/or season of year.

Optionally, in respect of the smart responsive electrical load, the device includes at least one of: (a) a battery; and (b) a domestic appliance.

More optionally, the device includes at least one of: (a) an electrical vehicle battery; (b) a washing machine, (c) a dish washer; and (d) an electric kettle Optionally, in respect of the smart responsive electrical load, the variable time delay ($t_p$) has associated therewith a willingness of the load to switch (WTS) which is susceptible to being adjusted relative to a defined frequency deviation at which the load is operable to try to maintain the state of the network. Reference is made to FIG. 5 and FIG. 7 in this respect.

More optionally, in respect of the smart responsive electrical load, a characteristic of the willingness to switch (WTS) is arranged to provide the network with a linearly-varying load response when a plurality of the loads are coupled to the network in operation. Reference is made to FIG. 7 in this respect.

According to a second aspect of the present invention, there is provided a method as claimed in appended claim 18: there is provided a method of operating a smart responsive electrical load operatively connectable to an electricity supply network, the smart responsive electrical load comprising an electrical power-consuming device and a control arrangement for controlling a supply of electrical power from the network to the device, characterized in that said method includes: (a) receiving a request for power to be provided to the device; (b) controlling using the control arrangement delivery of electrical power to the device by imposing a variable time delay ($t_p$) before supplying electrical power to the device after receiving the request for power to be provided to the device, the variable time delay ($t_p$) being a function of a state of the network.

According to a third aspect of the invention, there is provided a smart load system as claimed in appended claim 19: there is provided a smart load system for providing a responsive load to an electrical supply network, the smart load system including a plurality of smart loads pursuant to the first aspect of the invention.

According to a fourth aspect of the invention, there is provided a micro-generation device as claimed in appended claim 21: there is provided a micro-generation device operable to generate electricity for supplying to an electrical supply network, wherein the device is adapted for functioning to supply energy to a smart responsive electrical load pursuant to the first aspect of the invention, the micro-generation device being operable with a population of other micro-generation devices to provide stabilization of the supply network in response to a physical parameter of the supply network, the stabilization being depending upon a heat output and/or electrical power output of the micro-generation device.

It will be appreciated that features of the invention are susceptible to being combined in any combination without departing from the scope of the invention.

DESCRIPTION OF THE DIAGRAMS

Embodiments of the present invention will now be described, by way of example only, with reference to the following diagrams wherein.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS OF THE INVENTION

The present invention is concerned with automated responsive loads which are operable to delay their start-up pursuant to an algorithm which attempts to find an optimal balance between reducing likely start-up delay, and providing useful electrical supply network responsive load response as a function of electrical supply frequency (f) and/or electrical supply voltage magnitude (V). The loads are beneficially arranged so that their power-consuming behaviour is not interrupted or significantly modified once started. Issues related to unwanted consequences of interruption do not thereby arise. Moreover, electrical supply network load response is beneficially provided using numerous smart responsive electrical loads implemented pursuant to the present invention, such responsive electrical loads employing energy consuming processes which hitherto would have been considered unsuitable for providing load control of electrical supply networks. The present invention is contrasted, namely different, from "cold start assistance", also known as "black start assistance". "Cold start assistance" is concerned with allowing a time delay before starting loads after a electrical supply network recovers after being shut down, namely recovering from a "black out". The present invention concerns electrical supply network stabilization under normal continuous operating conditions.

Figure 1:
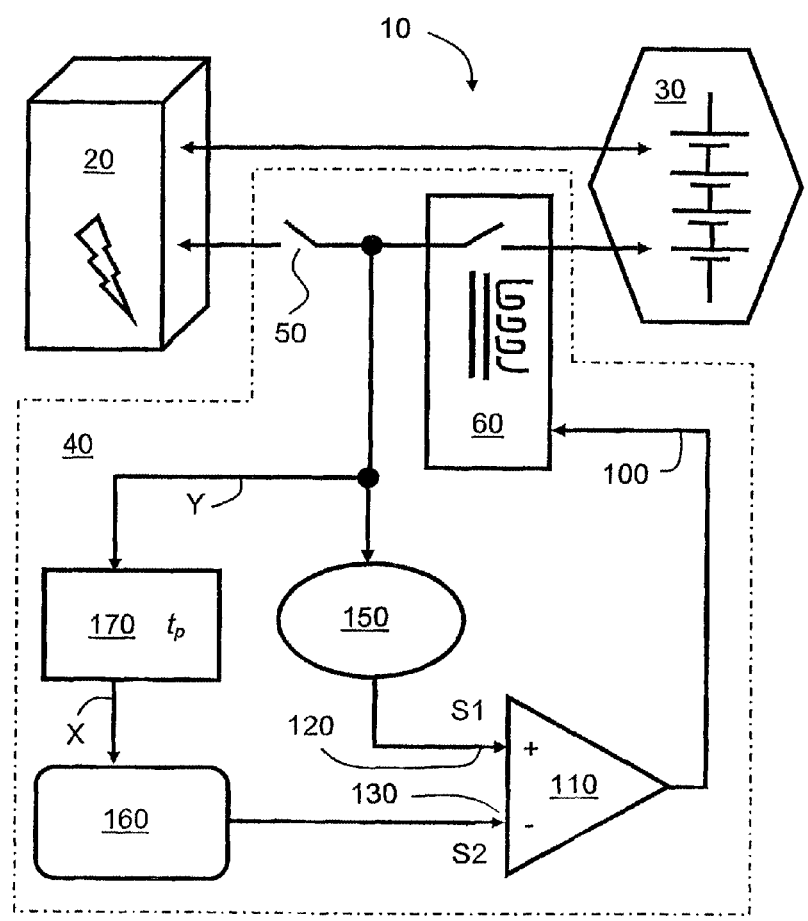
FIG. 1 is an illustration of a smart responsive electrical load pursuant to the present invention coupled to an electrical supply network.

Referring to FIG. 1, there is shown an illustration of a smart responsive electrical load pursuant to the present invention; the smart load is indicated generally by 10. The smart load 10 includes an electrical load 30 which is coupled via a control arrangement 40 to an electrical supply network 20. The control arrangement 40 includes a main power switch 50 connected in series with a latching contactor 60 between the electrical load 30 and the supply network 20. For example, the main power switch 50 is beneficially implemented to be user-operable, for example implemented as an ON/OFF switch or a plug/socket connector. Optionally, the latching contactor 60 is implemented using electronic components, for example by utilizing a combination of digital logic circuits and semiconductor power switching devices.

Optionally, the control arrangement 40 can be implemented to be devoid of the main power switch 50, namely the control arrangement 40 is merely an element included between the latching contactor 60 and the electrical load 30. When implementing the smart responsive load 10 in such a manner, the control arrangement 40 is then optionally implemented as a two terminal device, or as a three terminal device including a connection to an opposite other power line of the electrical supply network 20. When two terminal operation is employed for the control arrangement 40, the arrangement 40 provides benefits of:

(a) not requiring power after actuation when the latching contactor 60 is implemented as a true latching mechanical component; or (b) taking power after a contactor of the latching contactor 60 closes either from:
   (i) for example in a case of a triac or other solid state switch being employed, a small phase angle before a triac device is fired on each half mains cycle; or
   (ii) a voltage drop across the triac device.

A latching actuator 60 employed for the smart responsive load 10 needs resetting before a next operation of the smart load 10. Such resetting is achieved either by:
   (a) having the latching actuator 60 held on by a load current consumed by the electrical load 30, for example on an electric kettle, using for example a single turn of the load current to provide a closing force for the actuator 60, or
   (b) a mechanical linkage to the main power switch or other mechanical end of cycle indication.

Resetting of the latching actuator 60 can, for example, optionally be achieved by a signal generated by one or more sensing devices, for example from sensing devices measuring temperature and/or pressure change within an electrical battery being charged.

A control input 100 of the latching contactor 60 is coupled to an output of a comparator 110. The comparator 110 includes a non-inverting input 120 and an inverting input 130. The comparator 110 is operable to compare a first signal S1 provided at the non-inverting input 120 with a second signal S2 provided at, the inverting input 130. When the first signal S1 exceeds the second signal S2, the comparator 110 is operable to activate the latching contactor 60. Once the latching contactor 60 is energized, it remains latched to provide power from the supply network 20 to the electrical load 30.

The first signal S1 as generated by a frequency measurement function 150 is representative of an electrical supply frequency f of the supply network 20. Moreover, the second signal S2 is generated by a response function 160 whose input X is connected via a timer function 170 to an electrical side Y of the power switch 50 remote from the supply network 20 as illustrated. The timer function 170 is operable to provide a time delay $t_p$ from a time instance t=0 that the power switch 50 is switched from an OFF state to an ON state. In other words, in comparison to an arrangement devoid of the timer function 170, operation of the timer function 170 is to impose a time delay tp before power is supplied to the load 30.

Measurement of the frequency (f) of the mains electrical supply is beneficially implemented using an inexpensive microprocessor or microcontroller provided in operation with a clocking signal generated by a frequency-stable clock oscillator; for example, a simple 8-bit microcontroller is optionally employed. Beneficially, the clock oscillator includes a quartz crystal resonator for accurately defining an operating frequency of the oscillator. Such a microprocessor or microcontroller is beneficially programmable to count a number of clock pulses within one or more cycles of mains electrical supply as determined from zero-crossings in mains potential, or zero-crossing in mains current. On account of the quartz resonator being relatively frequency stable in respect of temperature and time, a nominal 50.0 Hz mains frequency for Europe supply networks corresponds to $N_k$ clock cycles per 20 mSec mains electrical supply cycle. When the instantaneous mains frequency $f_m$ deviates from a nominal 50.0 Hz frequency, a number of the clock cycles N counted by the microcontroller or microprocessor per cycle of electrical mains supply changes such that the frequency deviation $\Delta f$ from a nominal 50.0 Hz is readily computable from Equation 1 (Eq. 1):

Equation 1 (Eq. 1)

$$\Delta f = (N - N_k)\left(\frac{50.0 \text{ Hz}}{N_k}\right) = k(N - N_k) \qquad \text{Eq. 1}$$

wherein k is a constant determined by design.

Such a manner of determining the instantaneous frequency $f_m$ for the mains electrical supply is computationally simple to implement using inexpensive computing hardware capable of performing counting and multiplying functions. Similarly, the variable time delay $t_p$ can be computed on a basis of counting a number of clock cycles, thereby avoiding a need to implement complex numerical calculations when implementing the present invention. Consequently, the present invention is potentially of modest cost when implemented, for example using simple 4-bit or 8-bit microcontrollers.

Figure 8:
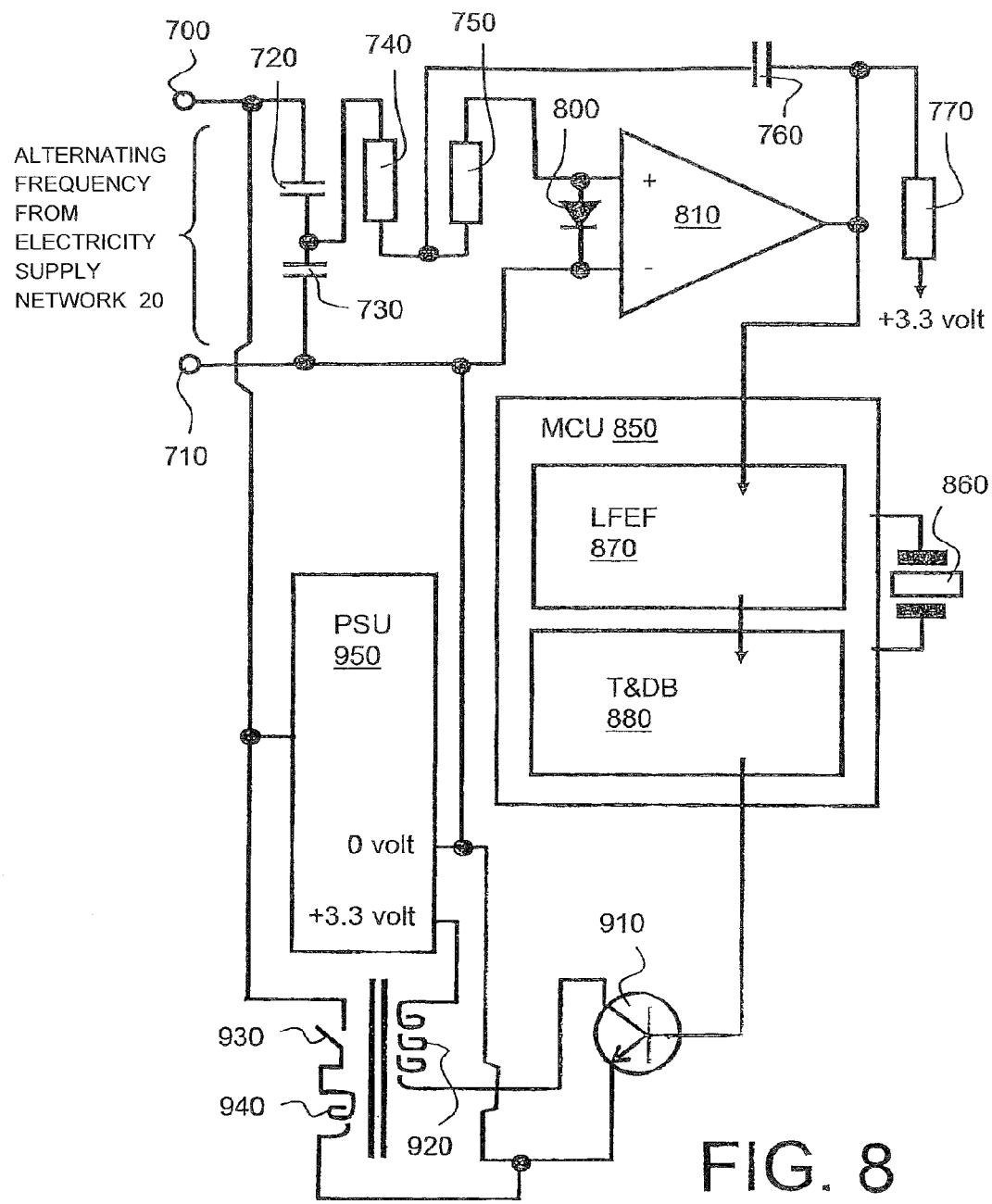
FIG. 8 is an illustration of a practical implementation of the smart response electrical load of FIG. 1.

A possible example implementation for the control arrangement 40 is illustrated in FIG. 8, wherein the arrangement 40 is a two terminal implementation, wherein a first terminal 700 is connected to the power switch 50, and a second terminal 710 is connected to the load 30. Electronic components 720 to 810 comprise a line edge detector circuit; the components 720 to 800 include resistors and capacitors. The line edge detection circuit combines a capacitive divider 720, 730 in combination with a comparator arrangement with positive feedback comprising resistors 740, 750 and a capacitor 760 coupled together as illustrated. A diode 800 is operable to ensure a correct d.c. bias for a comparator 810 whose output is coupled to a pull-up resistor 770. The output of the comparator 810 is susceptible to being used to generate a line zero crossing point of a mains supply provided to the control arrangement 40, thereby enabling the signal to be used for phase-controlled triac triggering purposes as well as line frequency measurement if needed. Example component characteristics include:

(a) the components 720, 730 are 1 nF and 33 nF capacitors respectively;
(b) the components 740, 750 are 470 k$\Omega$ and 390 k$\Omega$ resistors respectively;
(c) the components 760 is a 1 nF capacitor$\Omega$
(d) the component 800 is a 1N4148 silicon diode; and
(e) the component 770 is a 10 k$\Omega$ resistor.

The comparator 810 is implemented using a comparator device having operating characteristics generally similar to a proprietary LM393 semiconductor device. The comparator 810 and its associated circuit are susceptible to consuming only milliWatts of power when in operation.

Other components values are feasible, although (a) to (e) represent component values which have been tested in practice with satisfactory results.

For each line cycle, a microcontroller 850 included in the arrangement 40 in FIG. 8 is operable to count a number of clock cycles, as defined by a resonant frequency of a crystal resonator 860, between positive edges of an output from a comparator 810 connected as illustrated. Optimally, the number of clock cycles between negative edges present in the output from the comparator 810 is also measured, and averaged or added to the count between associated positive edges. This number of clock cycles is then fed as a value into a line frequency estimation (LFEF) filter 870 implemented via software executing on the microcontroller 850. Typical filter parameters for the filter 870 would be a two pole filter, exhibiting in operation a group delay in a range of 0.25 to 1 second, and a damping factor in a range of 1 to 1.5. A standard implementation of the filter 870 would be as an IIR filter, as an output is provided every line cycle, with minimal storage requirements. This filter 870 thus provides a compromise between noise rejection and measurement delay in determining line frequency. The components 700 to 850, 860, 870 are the implementation of a frequency measurement unit 150 which will be elucidated in greater detail later.

In FIG. 8, an output from the filter 870 is fed in operation to a decision unit 880 for implementing a functionality of items 170, 160, 110, resulting in the start output, fed via a transistor 910 to a contactor coil 920 of a contactor. In operation, when contacts 930 close, the current through the electrical load 30 keeps the contactor closed via a small coil 940 associated with the contactor; a power supply 950 is then no longer required for providing power to the control arrangement 40 once the contactor is closed. The contactor will reset once the current through the load 30 is interrupted, either by the user, or the load shutting off after its task has been completed. The control arrangement 40 of FIG. 8 provides advantages such as very low dissipation during the operation of the load 30, and a simple two terminal component independent of a remainder of an appliance or charger representing the load 30.

Thus, referring back to FIG. 1, in operation, when the power switch 50 is user-activated, the comparator compares the first signals S1 with the signal S2. When the first signal S1 exceeds the second signal S2, the latching contactor 60 is activated and connects the electrical load 30 to the supply network 20. A nature of the signals S1, S2 will now be elucidated in greater detail.

Figure 2A:
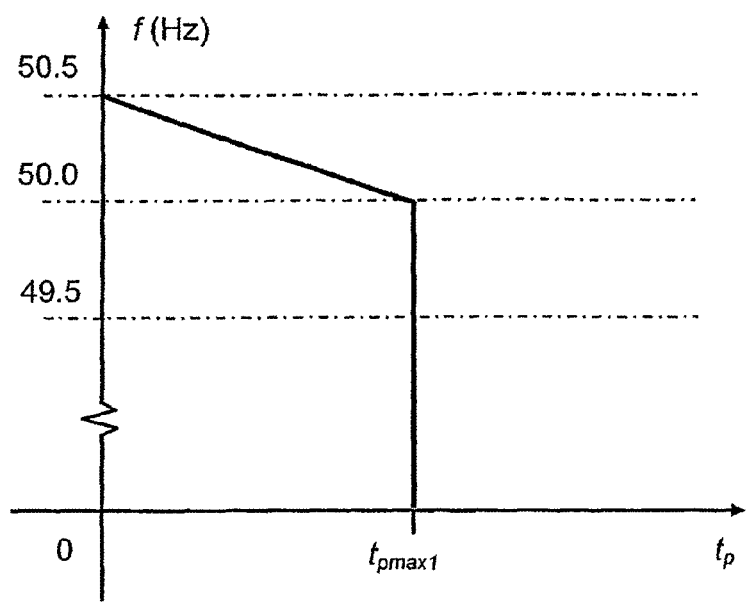
FIG. 2a to FIG. 2d are example illustrations of various response characteristics provided in operation by the smart responsive electrical load of FIG. 1.
Figure 2B:
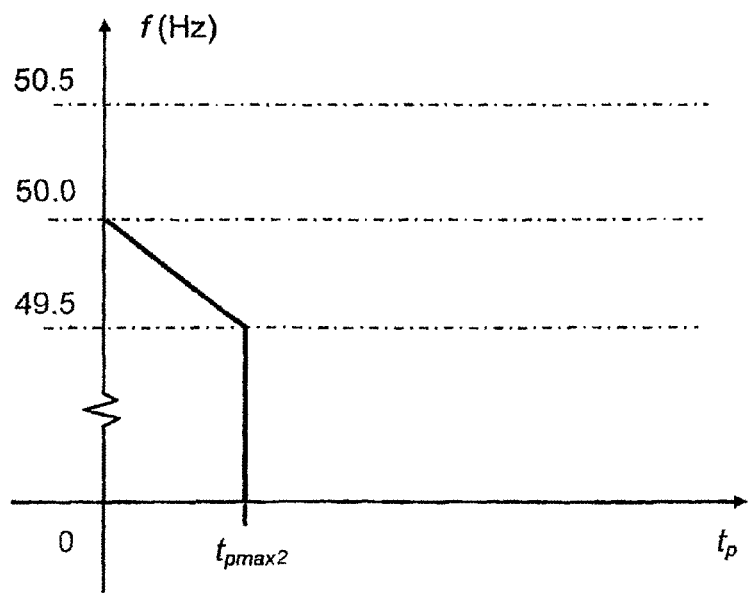
Figure 2C:
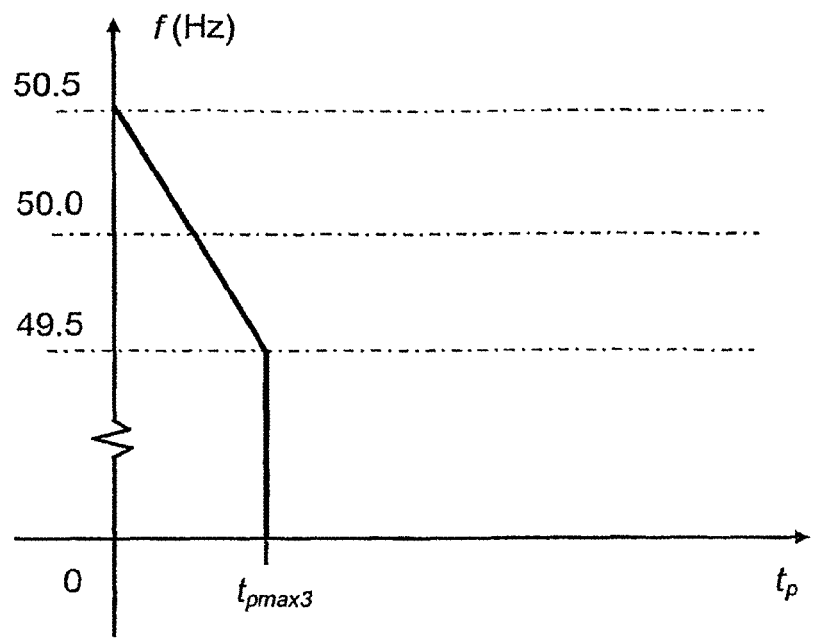
Figure 2D:
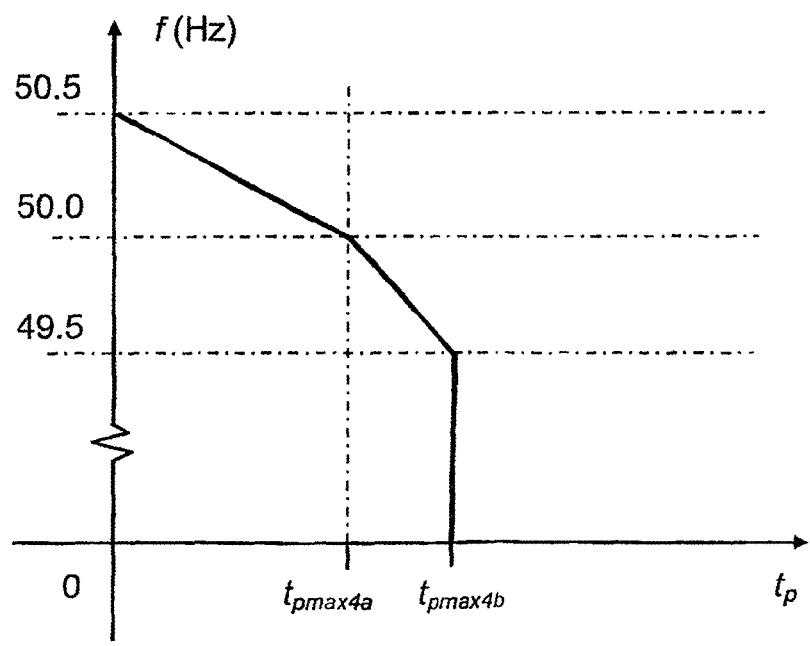

The timer function 170 is capable of being implemented to provide:
(a) a major high-side response as depicted in FIG. 2a;
(b) a major low-side response as depicted in FIG. 2b;
(c) a comprehensive major low-side and major high-side response as depicted in FIG. 2c; or
(d) a combination of minor low-side response and major high-side response as depicted in FIG. 2d.

"high side" relates to a response of the smart load 10 to mains electricity supply whose alternating frequency exceeds a nominal alternating frequency for the mains electricity supply to the smart load 10; for example, nominal main alternating frequency is 50 Hz in Europe, 60 Hz in USA and 400 Hz in specialist mobile small-scale electricity supply networks.

Moreover, the timer function 170 is driven by two parameters, namely whether or not the power switch 50 is in its ON state and the frequency f of electricity provided from the supply network 20. The time delay $t_p$ is a function of the frequency f as depicted in FIG. 2a to FIG. 2d, depending upon which control regime is employed in the smart load 10. Optionally, the control regime is dependent upon at least one of:
(a) time of day, for example night time in contrast to evening;
(b) period of year, for example season of year; and (b) signals received at the smart load 20 which control its function, for example a wireless or Internet directive from an operator of the supply network 20.

In FIG. 2a to FIG. 2d, the frequency f=50.0 Hz is a nominal desired operating frequency for the supply network 20.

In FIG. 2a, the time delay $t_p$ is 0 second when the frequency f is greater than 50.5 Hz. The time delay $t_p$ increases progressively from 0 seconds when the frequency f is 50.5 Hz to a limit $t_{pmax1}$ when the frequency f is 50.0 Hz. For the frequency f being lower than 50.0 Hz, the time delay $t_p$ is limited to $t_{pmax1}$ as illustrated.

In FIG. 2b, the time delay $t_p$ is 0 seconds when the frequency f is greater than 50.0 Hz. The time delay $t_p$ increases progressively to $t_{pmax2}$ for the frequency f decreasing from 50.0 Hz to 49.5 Hz. When the frequency f is less than 49.5 Hz, the time delay $t_p$ remains at a value $t_{pmax2}$.

In FIG. 2c, the time delay $t_p$ is 0 seconds when the frequency f is greater than 50.5 Hz. The time delay $t_p$ increases progressively from 0 seconds to $t_{pmax3}$ when the frequency f varies from 50.5 Hz to 49.5 Hz. When the frequency f is less than 49.5 Hz, the time delay $t_p$ remains at $t_{pmax3}$.

In FIG. 2d, the time delay $t_p$ is 0 seconds when the frequency f is greater than 50.5 Hz. The time delay $t_p$ increases progressively from 0 seconds to a value $t_{pmax4a}$ when the frequency f varies from 50.5 Hz to 50.0 Hz. Moreover, the time delay $t_p$ increases progressively from $t_{pmax4a}$ to $t_{pmax4b}$ when the frequency f varies from 50.0 Hz to 49.5 Hz. When the frequency f is less than 49.5 Hz, the time delay $t_p$ remains at a value $t_{pmax4b}$.

The timer function 170 is capable of being implemented with other types of characteristics to those illustrated in FIG. 2a to FIG. 2d which are intended to be illustrative examples. For example, a smooth function without discrete inflections is optionally utilized to reduce any tendency for the smart load 10 to synchronize in operation with other such smart loads when mutually coupled via an electricity supply network which is common thereto.

In operation, the smart load 10 tends to delay longer before engaging the latching contactor 60 when the frequency f is reduced due to heavier load on the supply network 20. FIG. 2a to FIG. 2d illustrate different regimes to implement the delay $t_p$ as a function of the frequency f at an instance when the power switch 50 is engaged. Optionally, the smart load 10 is operable to consider a previous average of the frequency f for a sampling period before an instance t=0 seconds when the power switch 50 is changed from its OFF state to its ON state; such consideration of a previous average is an example of pre-filtering. Yet more optionally, the frequency f is sampled for a period before the power switch 50 is engaged to model a temporal variation in the frequency f, the time delay $t_p$ is a function of a future anticipated extrapolated value for the frequency f. Such anticipated extrapolation effectively provides a differential feedback characteristic which is highly beneficial to dampen down oscillations in an electricity supply network subject to temporally fluctuating power generation capacity and power loading by power consumers.

More optionally, the delay $t_p$ is a function of a change in the frequency f during the delay period $t_p$. For example in FIG. 3, actuation of the latching contactor 60 to supply power to the electrical load 30 is also a function of a rate of increase in the frequency f. In other words, the time delay $t_p$ is dynamically changeable in response to frequency changes occurring once the time delay $t_p$ has been commenced. Moreover, for example in FIG. 4, actuation of the latching contactor 60 to supply power to the electrical load 30 is a function of a temporal rate of decrease of the frequency f being below a threshold value.

Figure 3:
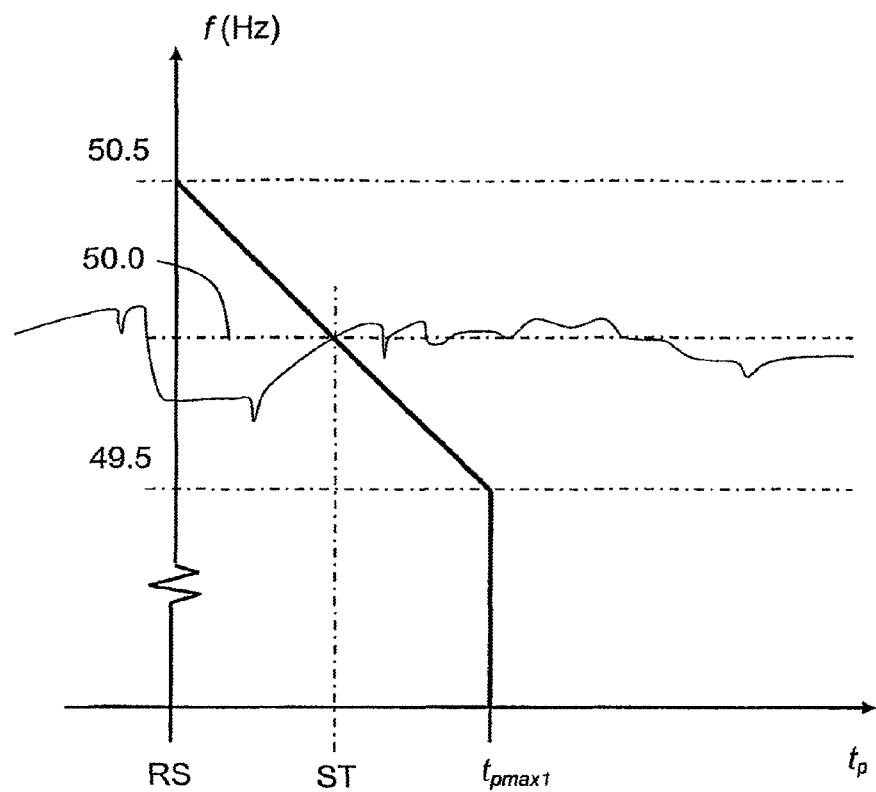
FIG. 3 is an example illustration of the smart responsive load being triggered by a change in a state of the network of FIG. 1, wherein the smart responsive load is operable to provide both high-side and low-side response.
Figure 4:
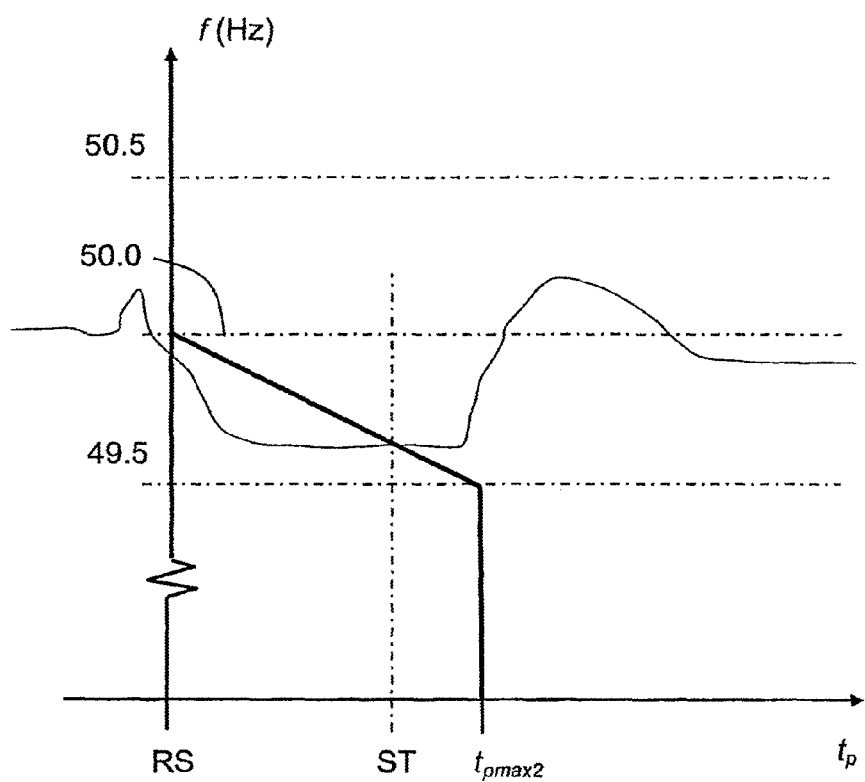
FIG. 4 is an example illustration of the smart responsive load being triggered by a change in a state of the network of FIG. 1, wherein the smart responsive load is operable to provide low-side response.

Optionally, switching characteristics as illustrated in FIGS. 2a to 2d are combined with switching characteristics as depicted in FIG. 3 and/or FIG. 4 to provide a degree of hybrid control from a Request Start (RS) when the power switch 50 is set to its ON state to an actual start time (ST) for high-side and low-side response respectively. The response function 160 is beneficially operable to provide this additional control over a basic timing delay function provided by the timer function 170.

A first situation will now be described wherein the smart load 10 is providing a high-side response for assisting to stabilize the supply network 20; "high-side response" corresponds to providing power stabilizing response from the smart load 10 for electrical supply frequencies f from supply network 20 which are greater than a nominal operating frequency for the network 20, for example above a nominal alternating frequency of 50.0 Hz for European electricity supply networks. Many smart loads 10 are beneficially coupled to the supply network 20 so as to provide a smoothly varying collective load to the network 20 which is responsive to stabilize the network 20 towards operating at substantially the nominal alternating frequency, for example f=50.0 Hz for European supply networks. A best stabilization response for the network 20 is beneficially provided without causing undue user inconvenience, for example users waiting for their plug-in hybrid vehicles to start charging after having been coupled to an electricity supply network. Electrical loads 30 with a slow ramp up when initially energized usually attain full power operation within 10 seconds; a start-up delay of circa 10 seconds is generally not noticeable to the user. Longer delays, for example less than 30 minutes, enable a greater degree of stabilization of the network 20. Yet longer delays, for example several hours or even several days may be necessary in a situation when the network 20 is very severely overloaded, for example when major power generators are non-operational due to maintenance or accident.

For example, the electrical load 30 is a battery charger for charging a battery at a rate of 3 kW, wherein the battery has a full energy capacity of 10 kWh. On account of the battery typically being only partially discharged in use before being recharged, a charging cycle of the battery involves storing circa 7 kWh energy. Assuming that a consumption of 3 kW occurs during a first 30 minutes of charging the battery when the frequency f is 50.5 Hz, and charging occurs after 2 hours delay when the frequency f is 50 Hz, a high side response of around 86 W is possible to achieve for assisting to stabilize the supply network 20.

A second situation will now be described wherein the smart load 10 is providing low-side response for assisting to stabilize the supply network 20; "low-side response" corresponds to providing power stabilizing response from the smart load 10 for electrical supply frequencies f from the supply network 20 which are less than a nominal alternating frequency of the supply network 20, for example below 50.0 Hz for European electricity supply networks. In other words, low-side response amounts to delaying starting the electrical load 30 that would otherwise have started if it had been directly connected to the supply network 20 when the frequency f is less than 50.0 Hz. To obtain low-side response that reacts in 10 seconds of less, only those smart loads 10 which would have reacted in less than 10 second are relevant. Similarly, to obtain low-side response reacting in 30 seconds or more, only those smart loads 10 which would have reacted in 30 seconds or more are relevant. In practice, for purposes of assisting to stabilize the network 20, fast-reacting low-side is best provided by high power loads 30 which are susceptible to many starts where a short nominal delay is anticipated by users.

For example, the load 30 is a domestic kettle which consumes 2.7 kW when in operation and requires 2 minutes to heat water within the kettle for the user. In an event that the kettle is used 10 times each day, a total daily power consumption associated with the kettle is 0.9 kWh, or an average of 37.5 W over a 24-hour period. When the start delay $t_p$ varies in a range of 0 seconds for f=50.0 Hz to 30 seconds for f=49.5 Hz, a low-side regulation response from the kettle of (2.7 kWh×30 seconds)/2.4 hrs=9.5 W throughout the 24 hour period is possible to achieve. In practice, such regulation provided by the kettle operating as the smart load 10 would be biased towards times of day when kettles are most often used.

For such a kettle, high-side response is also susceptible to being added as depicted in FIG. 2c, wherein the time delay $t_p$ increases progressively as the frequency f reduces from 50.5 Hz to 49.5 Hz. If a nominal delay of 30 seconds were used for enabling the smart load 10 including the kettle to provide more load regulation for the network 20, both high-side and low-side response can be provided wherein the smart load 10 including the kettle provides an intermediate amount of time delay $t_p$ when the frequency f is 50.0 Hz, the time delay $t_p$ reducing as the frequency f increases to approach 50.5 Hz corresponding to light loading of the network 20, and the time delay $t_p$ delay increasing as the frequency f decreases to approach 49.5 Hz corresponding to heavy loading of the network 20. For overnight charging of hybrid plug-in vehicles, a delay of minutes or even a couple of hours would generally be acceptable to users whilst the users are sleeping.

In a situation of a battery charger for the electrical load 30 of the smart load 10, a response characteristic as depicted in FIG. 2d is especially desirable, namely providing strong high-end response and relatively weaker low-end response such that $t_{pmax4b} \ll (2 \times t_{pmax4a})$ subject to $t_{pmax4b} > t_{pmax4a}$. The time delay $t_{pmax4a}$ is beneficially 2 hours when the frequency f=50.0 Hz. However, due to relatively infrequency of battery recharging in comparison to repeated use of a kettle for heating water, an amount of low-side regulation response for the network 20 provided by the smart load 10 implemented as a battery charger is relatively small, estimated to be 0.7 W for a 30-second time delay or 0.24 W for a 10-second reaction delay. Clearly, longer time delays of at least minutes or even hours is thus highly desirable for providing more significant response load control for the network 20.

In the foregoing, the smart load 10 exhibits from a user's viewpoint a characteristic of "willingness to switch" (WTS) which is a function of the frequency f of electrical power provided from the supply network 20. The "willingness to switch" (WTS) is beneficially implemented as a two-part function in a manner akin to FIG. 2d which provides regulation for both sides of a nominal operating frequency f of 50.0 Hz for the network 20. When many smart loads 10 are provided for coupling to the network 20 and also providing regulation for the network 20, the smart loads 10 are beneficially provided with mutually different "willingness to switch" (WTS) characteristics, namely effectively nominally different preferred target frequencies about which their low-side and high-side responses are implemented. Such mutually different WTS provides a smoother regulation response for the network 20 which assists to reduce regulation control oscillations and potential operating instabilities in respect of the network 20. Populations of power-consuming devices which are at least partially mutually coupled together via a common supply network and which are subject to switching events dependent upon an abrupt transition associated with some threshold, for example an abrupt transition in a comparator controlling power consumed by a given device, will tend to mutually synchronize unless a manifestation of randomness is injected reduce a tendency for such synchronization to occur. In the case of the present invention, the delay $t_p$ varying from one smart load 10 to another is used to provide such randomization; such variation is derived from a "willingness to switch" (WTS) of the smart load 10.

Figure 5:
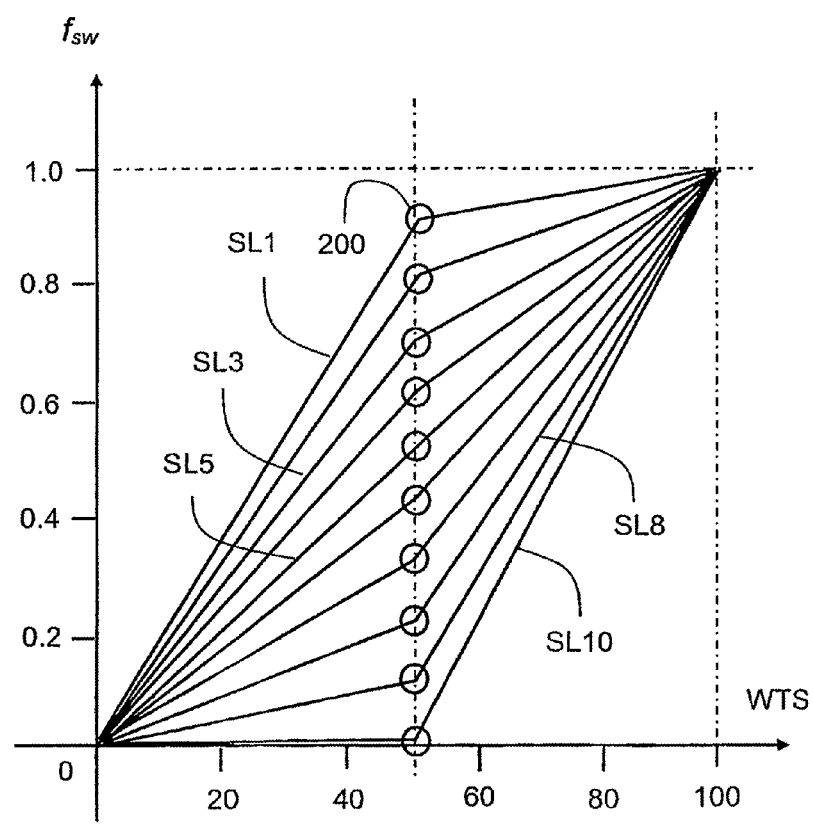
FIG. 5 is an illustration of willingness-to-switch (WTS) characteristics for a plurality of the smart loads of FIG. 1.
Figure 6:
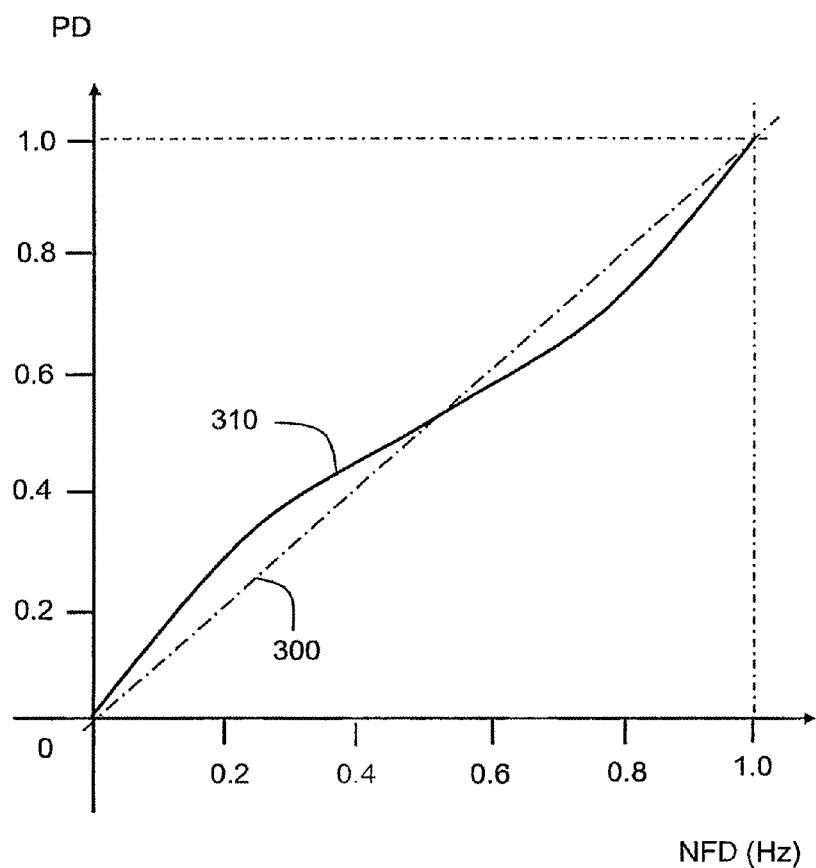
FIG. 6 is an illustration of a response regulation characteristic provided by the plurality of smart loads having characteristics as depicted in FIG. 5.

Referring to FIG. 5, there is illustrated a collection of response of ten smart loads 10 denoted by SL1 to SL10. An abscissa axis denotes "willingness to switch" (WTS) and an ordinate axis denotes deviation from nominal switching frequency, for example a nominal frequency f=50.0 Hz for European power supply networks. A target frequency for each smart load 10 (SL) is denoted by a circle 200 in FIG. 5. There is thus provided a plurality of smart loads 10 with mutually different target frequencies about which their high-side and low-side responses are arranged. Optionally, the smart loads 10 are each operable to randomly adopt amongst the characteristics depicted in FIG. 5 regarding which "willingness to switch" to employ. Such adoption is beneficially a function of behaviour of the network 20; for example, a tendency of the network 20 to operate at frequencies f lower than 50.0 Hz causes the smart loads 10 to automatically adopt a regime wherein they provide greater low-end response. When such operation of the smart loads 10 is employed, an operating characteristic for loading the network 20 as depicted in FIG. 6 is obtained, wherein an abscissa axis NFD corresponds to normalized frequency deviation, and an ordinate axis PD corresponds to a fraction of smart loads 10 turned to ON status. A curve 300 corresponds to a response characteristic for the smart loads 10 when a linear regulation response is employed in the smart loads 10, for example as depicted in FIG. 2b, and a curve 310 corresponds to a collection of mutually different response for the smart loads 10 as depicted in FIG. 5. From FIG. 6, it will be appreciated that the smart loads 10 initially turn on more quickly for the curve 310 in comparison to the smart loads 10 being all similar as pertains for the curve 300.

Figure 7:
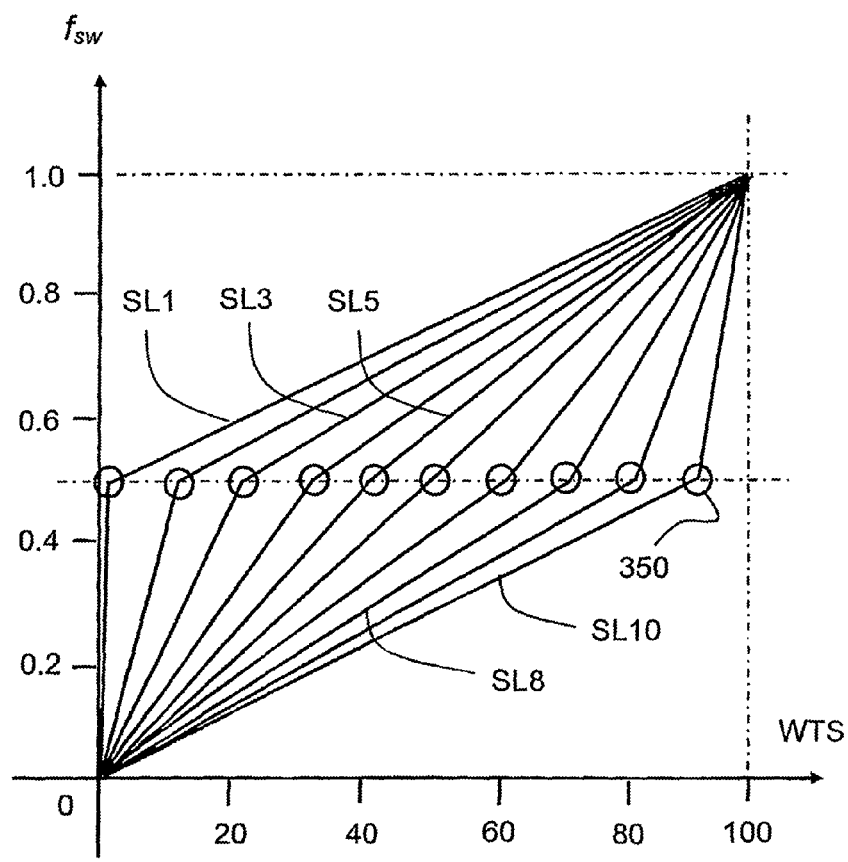
FIG. 7 is an illustration of alternative willingness-to-switch (WTS) characteristics for a plurality of the smart loads of FIG. 1.

An improved characteristic is obtainable from a plurality of the smart loads 10 (SL) implemented to provide mutually different load regulation characteristics for stabilizing the network 20 is obtained when the smart loads 10 (SL) are arranged to provide characteristics as depicted in FIG. 7, namely each smart load 10 is assigned a "target WTS" instead of a target frequency. A distribution of "target WTS" within a groups of smart loads 10 (SL) is beneficially uniformly distributed as depicted in FIG. 7. Moreover, the smart loads 10 are susceptible to having their "target WTS" modified at random and/or in response to instructions communicated to the smart loads 10, for example via Internet and/or wireless communication from an operator of the supply network 20.

In FIG. 7, each line represents a smart load 10 having a particular target WTS represented by a circle 350 for each line. The smart loads 10 will each switch when the frequency f of the network 20 deviates to a magnitude comparable to a switching frequency associated with its own WTS state. Each smart load's (SL) target WTS is a WTS value at a mid-frequency excursion, namely at a turning point for the smart load 10.

The inventors have appreciated, both by simulation and calculation, that if the target WTS of a population of the smart loads 10 are evenly distributed over a range of possible WTS, and the actual WTS of the smart loads 10 vary linearly with time and are independent, then the population will respond linearly to a frequency excursion of the frequency f away from its nominal desired value, for example 50.0 Hz; such linear response is to be understood to represent the number of smart loads 10 turning ON and OFF as a function of frequency. For a small population of the smart loads 10, such switching will be subject to quantization coarseness but is observed to be averaged to a smooth response for a large population of the smart loads 10. Such a smooth response for the large population is highly advantageous for avoiding synchronization effects from occurring in amongst the population and is therefore capable of providing greater stability of the network 20 in operation.

In order to obtain a useful linear response from the population of smart loads 10 implemented pursuant to FIG. 7, it is not necessary that the target WTS are distributed evenly. It is sufficient that a numerical mean of the WTS target values is substantially equal to a mid-WTS value, for example 0.5 in a range of 0 to 1. Optionally, a half-sine distribution, a triangular distribution or even an asymmetrical distribution of WTS target values can be beneficially employed to provide smart load stabilization of the network 20. FIG. 7 does not represent a unique solution for providing a linear response to frequency deviations occurring within the network 20 based upon employing a time delay t, before coupling a load to the network 20. However, a basic desirable requirement is that an average gradient of all the WTS frequency curves for all devices considered in aggregate must be substantially constant as a function of the frequency f.

The control arrangement 40 illustrated in FIG. 1 is optionally implemented as a retrofit to existing electrical loads 30. Alternatively, the control arrangement 40 is susceptible to being integrally incorporated into new devices for coupling to the network 20. Optionally, the control arrangement 40 is implemented, at least in part, using computing hardware operable to executed one or more software products for implementing the present invention; one or more software products are recorded on a machine-readable data storage medium. Yet alternatively, the control arrangement 40 is susceptible to being implemented in hard-wired electronic circuits, for example in application specific integrated circuits (ASICs), custom integrated circuits and similar.

The present invention is highly desirable for future plug-in electric vehicles which are recharged via electricity supply networks where it is desirable to avoid periodic overloading of such supply networks. Optionally, such plug-in electric vehicles have their batteries divided into a plurality of sub-groups of battery cells, wherein the groups are charged temporally in a sequence of groups, and wherein each group of battery cells can be subject to a delay $t_p$ in charging pursuant to the present invention for providing more flexible and less granular stabilization of the supply network 20. Such charging of sub-groups of batteries is beneficially implemented in combination with executing cell balancing for attempting to avoid mutual deviation in cell charging characteristics as a function of progressive discharge/recharge cycles.

Modifications to embodiments of the invention described in the foregoing are possible without departing from the scope of the invention as defined by the accompanying claims.

Although embodiments of the invention has been described in the foregoing in respect of frequency f of the supply network 20, it will be appreciated that the present invention is similarly applicable where supply voltage magnitude V is a parameter employed for varying and controlling the time delay $t_p$ via the control arrangement 40. Yet alternatively, the control arrangement 40 is operable to vary and control the time delay $t_p$ via a composite parameter which is both a function of the frequency f and the supply voltage magnitude V. For example, simultaneous occurrence of a low frequency f and low supply voltage magnitude V can result in the smart load 10 delaying an especially long time before beginning to consume power for a given process, for example battery charging or other uninterruptible process. Such a characteristic enables the smart load 10 to cope with extreme load conditions when there is a significance risk of a "black out" potentially occurring.

Figure 9:
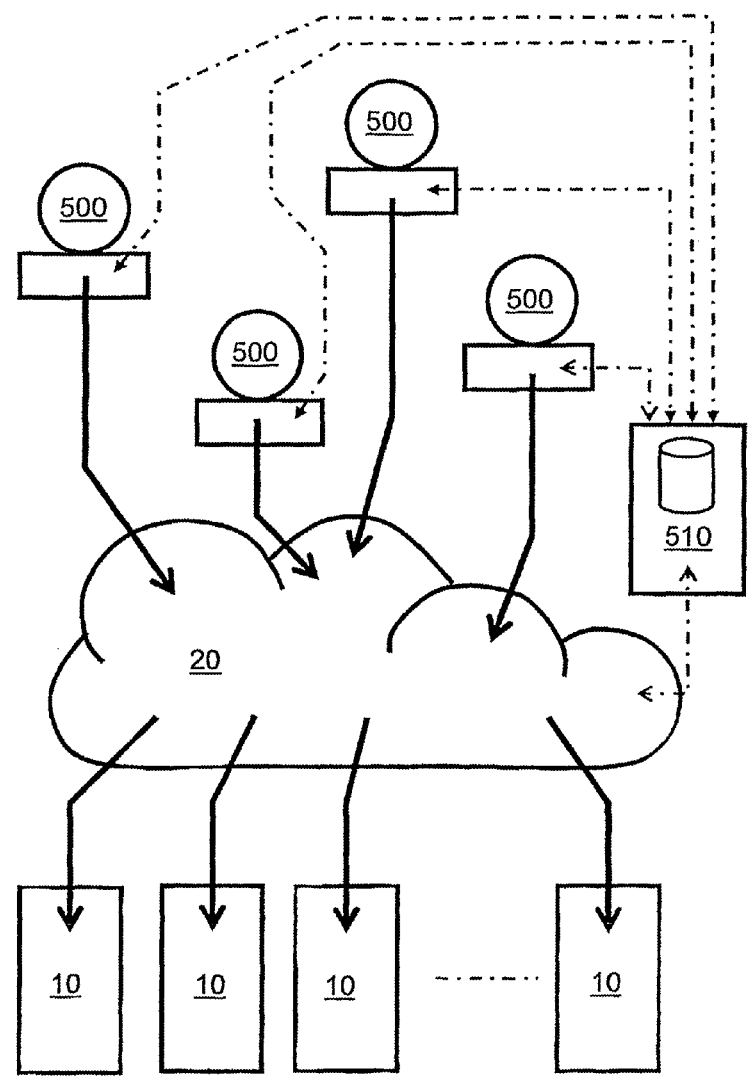
FIG. 9 is an illustration of the smart responsive load of FIG. 1 provided with electrical power from a population of microgeneration devices.

The present invention is concerned with smart responsive electrical loads which can be used to stabilize electricity supply networks. Beneficially, the present invention is susceptible to being used in combination with a population of micro-generation devices 500 operable to supply electrical energy to the electrical supply networks 20 as illustrated in FIG. 9. Beneficially, the net electrical power provided by the population of devices 500 is related to a physical parameter of the electrical supply networks 20, for example at least one of:

(a) frequency of the electrical supply networks 20;
(b) voltage magnitude of the electrical supply networks 20;
(c) earlier past (historical) values of parameters in (a) and/or (b) of the electrical supply networks 20; and
(d) future predicted (anticipated) values of parameters in (a) and/or (b) based upon earlier past (historical) values of parameters in (a) and/or (b).

The earlier past (historical) values are beneficially sensed and recorded locally at the micro-generation devices 500. Additionally, or alternatively, the earlier past values are sensed locally at the micro-generation devices 500 and communicated to a central facility 510, wherein the central facility 510 is operable to coordinate stabilization of the electricity supply networks 20. Yet additionally, or alternatively, the micro-generation devices 500 are controlled from a central facility 510, for example via a wireless network or Internet, which is operable itself to monitor the values of the electricity supply networks 20. The micro-generation devices 500 beneficially include at least one:

(i) macro-sized and micro-sized hydroelectric power generation arrangements, for example water turbines installed to mountain streams;
(ii) small wind turbine arrangements, for example vertically mounted Darrieus-type wind turbine arrangements or conventional orientated horizontal-axis propeller-type wind turbine arrangements mounted in respect of private dwellings and/or commercial premises, for example on roofs of domestic houses;
(iii) silicon and/or thin-film electrical solar cells, for example mounted to roofs of domestic houses;
(iv) solar mirror electrical power generating arrangements, for example mounted to roofs of domestic houses;
(v) ocean wave energy generation schemes, for example electrical power generation arrangements implemented along ocean coasts and within major inland regions of water, for example oscillating water columns and submerged tidal turbines, for example associated with seaside holiday dwellings;
(vi) electrical power generation schemes based on combustion, for example based upon combustion of gas, biomass and/or flammable waste products, for example on farms, in saw-mills, in rubbish-disposal premises and so forth, although other types of macro-sized and micro-sized generation devices are feasible to employ. For example, micro-generation is used to generate hot water by consuming a primary fossil fuel such as gas (methane, propane); such micro-generation beneficially generates some electricity as a bi-product, which can be selectively supplied to the electricity supply networks 20.

Beneficially, there is provided in association with the present invention a population of micro-generator devices 500 wherein a net electrical power generation of the population is related to a physical parameter of an electricity supply network 20, so that the devices 500 are operable to provide a response service to assist to stabilize operation of the supply network 20, the devices 500 being operable to compute independently their heat output and/or electrical power output for providing a stabilizing response to the supply network 20.

Use of such micro-generation devices 500 is of benefit in that supply of electrical power to the supply network 20 can be provided from diversified sources, thereby enhancing reliability of electrical supply to the supply network 20 whilst simultaneously synergistically also providing a stabilizing response service to the supply network 20. Moreover, response control to stabilize the supply network 20 is highly desirable because electrical output from individual given micro-generator devices 500 can be very variable, for example as a result of strong wind conditions during certain specific days and/or major precipitation events and/or sudden availability of combustible biomass at certain other times of year, for example straw from harvesting operations.

Thus, the present invention is not only susceptible to providing demand response by employing smart electric-power consuming devices 10, for example smart battery chargers with time delay response to provide corresponding network stabilizing response, but is also susceptible to providing micro-generation devices 500 for supplying power to an electricity supply network 20 to which such smart consuming devices 10 are coupled. The present invention is relevant, for example, to the provision in Scandinavia of electric rechargeable vehicles provided with power from micro-generation devices 500 for example.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural.

Numerals included within parentheses in the accompanying claims are intended to assist understanding of the claims and should not be construed in any way to limit subject matter claimed by these claims.

While the foregoing is directed to embodiments of the present invention, other and further embodiments of the invention can be devised by those of ordinary skill in the art based on this description without departing from the basic scope thereof, and the scope thereof is determined by the claims that follow.

We claim:

1. A smart responsive electrical load operatively connectable to an electricity supply network, said smart responsive electrical load comprising an electrical power-consuming device and a control arrangement for controlling a supply of electrical power from the network to the device,
    characterized in that
    said control arrangement is operable to:
        detect a request for power to be provided to an electrical power-consuming device;
        determine a delay value for a variable time delay ($t_p$) as a function of a state of said network at the time of the request for power to be provided to the electrical power-consuming device;
        impose said determined delay value of said variable time delay ($t_p$) before supplying electrical power to the device; and
        supply electrical power in an uninterrupted manner to the electrical power-consuming device after said determined delay value of said variable time delay ($t_p$) has elapsed.

2. A smart responsive electrical load as claimed in claim 1, wherein said state of said network is a supply frequency (f) of said network.

3. A smart responsive electrical load as claimed in claim 1, wherein said state of said network is a supply magnitude (V) of said network.

4. A smart responsive electrical load as claimed in claim 2, wherein said control arrangement is configured to receive in operation a digital clock signal for reference, said control arrangement being operable to compute said supply frequency (f) as a number of clock signal counts, and said control arrangement being operable to compute said variable time delay ($t_p$) as a function of multiples of said clock signal counts.

5. A smart responsive electrical load as claimed in claim 4, wherein said delay is not susceptible to being overridden by user intervention.

6. A smart responsive electrical load as claimed in claim 2, wherein said control arrangement is operable to apply electrical power to said device in response to said supply frequency (f) exceeding a threshold frequency value, said power being then applied to the device in an uninterrupted manner.

7. A smart responsive electrical load as claimed in claim 3, wherein said control arrangement is operable to apply electrical power to said device in response to said supply magnitude (V) exceeding a threshold magnitude value, said power being then applied to the device in an uninterrupted manner.

8. A smart responsive electrical load as claimed in claim 6, wherein said control arrangement is operable to provide solely low-side response for the supply frequency (f) being lower than a nominal preferred value thereof.

9. A smart responsive electrical load as claimed in claim 7, wherein said control arrangement is operable to provide solely low-side response for the supply magnitude (V) being lower than a nominal preferred value thereof.

10. A smart responsive electrical load as claimed in claim 6, wherein said control arrangement is operable to provide solely high-side response for the supply frequency (f) being greater than a nominal preferred value thereof.

11. A smart responsive electrical load as claimed in claim 7, wherein said control arrangement is operable to provide solely high-side response for the supply magnitude (V) being greater than a nominal preferred value thereof.

12. A smart responsive electrical load as claimed in claim 1, wherein said control arrangement is operable to provide a combination of high-side response for the supply frequency (f) being greater than a nominal preferred value thereof, and low-side response for the supply frequency (f) being lower than the nominal preferred value.

13. A smart responsive electrical load as claimed in claim 1, wherein said control arrangement is operable to provide a combination of high-side response for the supply magnitude (V) being greater than a nominal preferred value thereof, and low-side response for the supply magnitude (V) being lower than the nominal preferred value.

14. A smart responsive electrical load as claimed in claim 6, wherein said threshold frequency value corresponds to at:
    (a) a nominal maximum value for the supply frequency (f); or
    (b) a nominal value for the supply frequency (f); or
    (c) a nominal minimum frequency value for the supply frequency (f).

15. A smart responsive electrical load as claimed in claim 6, wherein said threshold frequency value is adjustable remotely from said control arrangement.

16. A smart responsive electrical load as claimed in claim 6, wherein said threshold frequency value is randomly adjustable for enabling a plurality of said smart loads coupled to the network to provide a collectively smoothly changing load characteristic to said network.

17. A smart responsive electrical load as claimed in claim 1, where said state of said network is subject to pre-filtering for defining a threshold value for controlling said variable time delay ($t_p$).

18. A smart responsive electrical load as claimed in claim 6, wherein said threshold value is varied in response to time-of-day and/or season of year.

19. A smart responsive electrical load as claimed in claim 1, wherein said device includes at least one of:
    (a) a battery; and
    (b) a domestic appliance.

20. A smart responsive electrical load as claimed in claim 19, wherein said device includes at least one of:
    (a) an electrical vehicle battery;
    (b) a washing machine; and
    (c) a dish washer.

21. A smart responsive electrical load as claimed in claim 1, wherein said control arrangement is operable to determine a delay value for said variable time delay ($t_p$) based on a willingness of said load to switch (WTS) which is susceptible to being adjusted relative to a defined frequency deviation at which said load is operable to try to maintain said state of said network.

22. A smart responsive electrical load as claimed in claim 21, wherein a characteristic of said willingness to switch (WTS) is arranged to provide the network with a linear-varying load response when a plurality of said loads are coupled to the network in operation.

23. A method of operating a smart responsive electrical load operatively connectable to an electricity supply network, said smart responsive electrical load comprising an electrical power-consuming device and a control arrangement for controlling a supply of electrical power from the network to the device,
    characterized in that said method includes:
    (a) receiving a request for power to be provided to said device;
    (b) determining a delay value for a variable time delay ($t_p$) as a function of a state of said network at the time of the request for power to be provided to said electrical power-consuming device;
    (c) controlling using said control arrangement delivery of electrical power to the device by imposing said determined delay value of said variable time delay ($t_p$) before supplying electrical power to the device; and
    (d) supplying electrical power in an uninterrupted manner to said electrical power-consuming device after said determined delay value of said variable time delay ($t_p$) has elapsed.

24. A smart load system for providing a responsive load to an electrical supply network, said smart load system including a plurality of smart load as claimed in claim 1.

* * * * *